April 14, 1925.
L. S. HESS
1,533,550
DEVICE FOR OILING MOLDED LOAVES
Filed Dec. 30, 1921
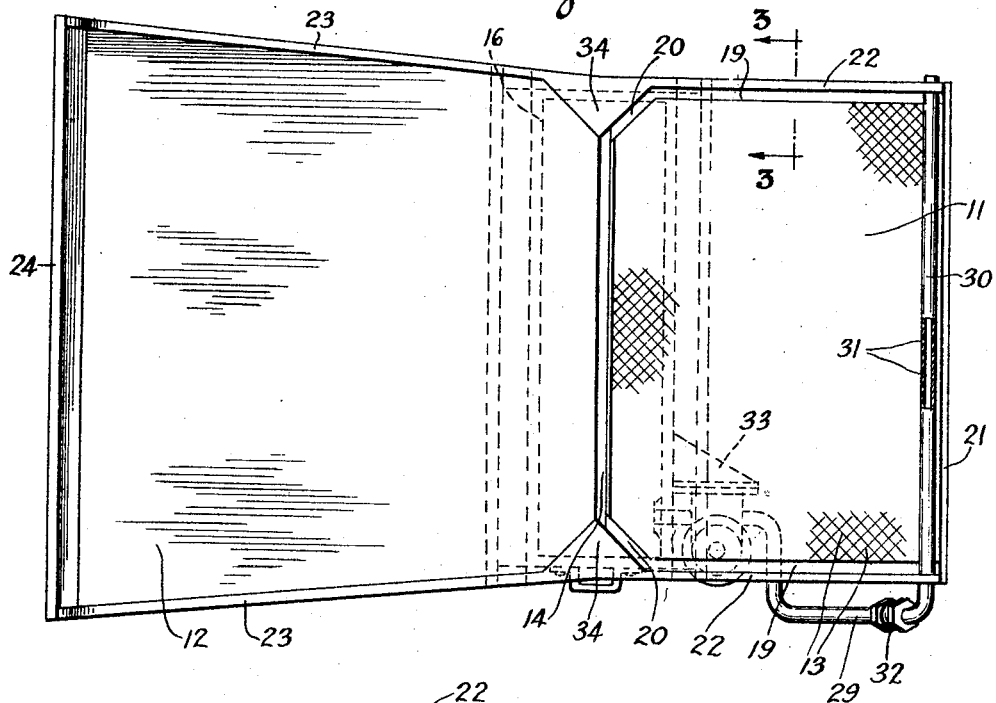
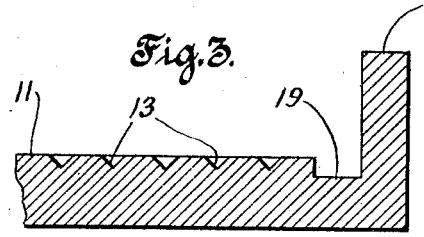
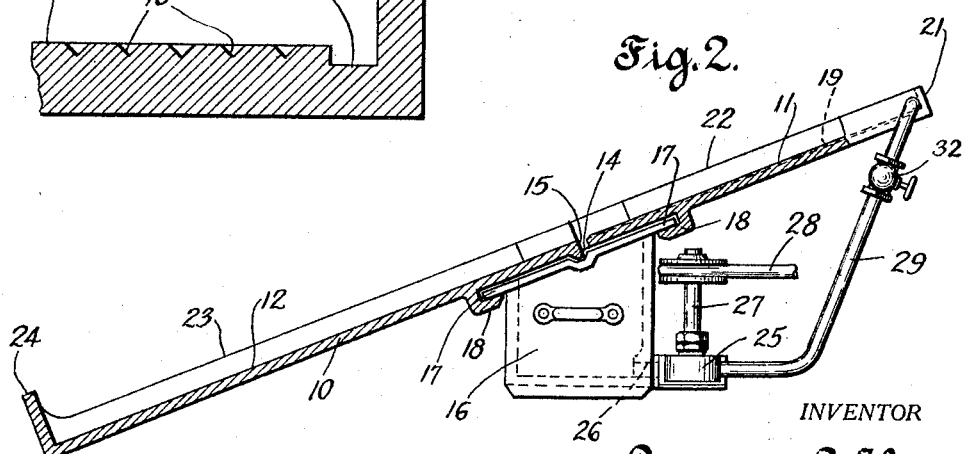
INVENTOR
Lawrence S. Hess
BY E. M. Marshall
ATTORNEY Patented Apr. 14, 1925.

1,533,550

UNITED STATES PATENT OFFICE.

LAWRENCE S. HESS, OF MIDDLETOWN, NEW YORK.

DEVICE FOR OILING MOLDED LOAVES.

Application filed December 30, 1921. Serial No. 525,947.

*To all whom it may concern:*

Be it known that I, LAWRENCE S. HESS, a citizen of the United States, and a resident of Middletown, Orange County, and State of New York, have invented certain new and useful Improvements in Devices for Oiling Molded Loaves, of which the following is a specification.

This invention relates to devices for oiling molded loaves of bread prior to the baking of the loaves.

As is well known molded loaves of bread must be treated with a coating of butter oil or grease after they are discharged from the molding machine and before they are placed in the baking pans or the pans must be greased.

One of the objects of the invention is to provide a device for oiling bread loaves, so constructed and arranged that the device will be sanitary, will not become rancid and oil soaked and can be easily cleaned.

Another object of the invention is to provide an oiling device of the character described that will utilize a minimum amount of oil, due to the fact that the excess oil is collected and returned to the oil imparting surface.

Another object of the invention is to provide in an oiling device of the character described an oiling surface that will act effectively as an oil transmitting medium but will not absorb oil.

Another object of the invention is to provide a device of the character described that is simple in construction, comprises few parts and can be economically manufactured.

Further objects of the invention will appear from the following specification taken in connection with the drawings, which form a part of this application and in which:

Fig. 1 is a top plan view of an oiling device constructed in accordance with invention.

Fig. 2 is a longitudinal sectional elevation of the device shown in Fig. 1, the device being shown in the position of use.
Fig. 3 is a transverse sectional elevation taken substantially on line 3—3 of Fig. 1.

Briefly described, the invention comprises an oiling device having an impervious oiling surface adapted to be supported in a position to receive the molded loaves as they are discharged from the molding machine. Means is provided for feeding oil to this surface from a supply tank and for returning excess oil to the tank to be used over again.

Referring to the drawings, the oiling device in the particular embodiment of the invention shown comprises an elongated member 10 consisting of an impervious oiling surface 11 and a tray 12 adapted to receive the loaves after they have been oiled.

The portion 11 having the impervious oiling surface is provided with diagonal grooves 13 and with a transverse slot 14 at its lower end. The lower edge of the slot has formed thereon a transversely extending portion or web 15, which forms an abutment and guide for returning the oil passing through the slot to a tank 16, having flanges 17, supported in guideways formed by offset transversely extending supporting members 18.

The oiling device thus far described and comprising the portions 11 and 12 and the supporting members 18 is preferably formed from a single casting.

To assist in guiding the excess oil from the side edges of the oiling surface 11 to the slot 14, the side edges of the portion 11 have grooves 19 co-acting with grooves 20, which, in turn, communicate with the slot 14. The portion 11 of the oiling device has also formed thereon an upper end wall 21 and side walls 22 and the tray 12 has side walls 23 and a bottom end wall 24.

Any desired means may be employed for feeding oil to the oiling surface 11 and in the particular embodiment of the invention illustrated I have shown a pump 25 communicating through a conduit 26 with the supply tank 16 and driven from a shaft 27 which, in turn, is connected in any suitable manner as by a belt 28 to a source of power. The pump 25 discharges the oil through a pipe 29 to a feed pipe 30, disposed at the upper end of the oiling surface and having a plurality of feed openings 31 through which the oil may pass to the oiling surface. A valve 32 is mounted on the pipe 29 and controls the amount of oil fed to the pipe 30. In the particular form of the invention illustrated the pump 25 is carried by a bracket 33 formed on or secured to the supply tank 16. As shown in Fig. 1 inclined extensions 34 are formed at the ends of the side walls 22 and operate in conjunction with the grooves 20 to return the excess oil to the slot 14.

The oiling device above described operates as follows:

The device is first placed in a position adjacent to the discharge end of a molding machine and is supported on the plane of the bottom of the supply tank 16 in the inclined position shown in Fig. 2. When the pump is started oil is fed through the pipe 29 to the feed pipe 30 and passes through the openings 31 to the upper edge of the oil surface 11. The oil will then flow by gravity down across the oiling surface and through the diagonal grooves 13, thereby imparting to the oiling surface a coating of oil. The amount of oil on the surface can be controlled by means of the valve 32. After passing across the oiling surface and through the grooves the oil is returned through the slot 14 to the supply tank 16 and may be again fed by the pump to the feed pipe 30. The molded loaves of bread will roll by gravity across the oiling surface thereby become coated with the oil and from the surface 11 will pass to the tray 12 from which they may be taken to the baking pans.

Particular importance is attached to the character of the oiling surface 11 and attention is called to the fact that this oiling surface is metallic and will not absorb oil and become rancid, as is the case with surfaces formed from textile material such as cloth or felt. Furthermore, the oiling surface can be easily and quickly cleaned by wiping the surface over with a cloth or other absorbent material. It will also be noted that the oiling device is very simple in construction, comprises few parts and can be economically manufactured. By reason also of the fact that all of the excess oil is returned to the supply tank, none of the oil is wasted and a minimum amount of oil is required.

Although I have in the above specification described one specific embodiment of my invention, it will be understood that the invention is capable of modification and that changes in the construction and in the arrangement of the various co-operating parts may be made without departing from the spirit or scope of the invention as expressed in the following claims.

What is claimed is:

1. A device for oiling loaves comprising a member having an impervious grooved surface adapted to receive loaves from a molding machine.

2. A device for oiling loaves comprising a member having an impervious diagonally grooved surface adapted to receive loaves from a molding machine.

3. A device for oiling loaves comprising a member having a diagonally grooved oiling surface and an oil supply conduit for feeding oil to said surface.

4. A device for oiling loaves comprising a member having an impervious diagonally grooved oiling surface and an oil supply conduit for feeding oil to said surface.

5. A device for oiling loaves comprising a member having a supporting surface, and a diagonally grooved oiling surface inclined with respect to the supporting surface, and an oil supply conduit for feeding oil to said surface.

6. A device for oiling loaves comprising a member having an oil supply tank, an impervious, grooved oiling surface, means communicating with said tank, for feeding oil to said surface, and means for conducting excess oil to said supply tank.

7. A device for oiling loaves comprising a quadrangular member having diagonal grooves thereon, means for feeding oil to one edge of said member, a tank, and means for conducting oil from the other edges of said member to said tank.

8. A device for oiling loaves comprising a quadrangular member having diagonal grooves thereon, means for feeding oil to one edge of said member, a tank, and a slot in said member along the edge opposite the first mentioned edge and leading to said tank and means for conducting oil from the two other edges of said member to said slot.

9. A device for oiling loaves comprising a quadrangular impervious member having diagonal grooves thereon, means for feeding oil to one edge of said member, a tank, and means for conducting oil from the other edges of said member to said tank.

10. An oiling device comprising a quadrangular member having an impervious, diagonally grooved oiling surface, a tank supported below said member and having a base disposed at an angle with respect to said member for supporting said member in a downwardly inclined position, an oil supply pipe at the upper edge of said member, said member having a slot along the lower edge of the oiling surface leading to the tank and means for conducting excess oil to said slot.

11. An oiling device comprising a quadrangular member having an impervious, diagonally grooved oiling surface, a tank supported below said member and having a base disposed at an angle with respect to said member for supporting said member in a downwardly inclined position, an oil supply pipe at the upper edge of said member, said member having a slot along the lower edge of the oiling surface leading to the tank, means for conducting excess oil to said slot, and means for feeding oil from said tank to the supply pipe.

12. An oiling device comprising a quadrangular member having an impervious, diagonally grooved oiling surface, a tank supported below said member and having a base disposed at an angle with respect to said member for supporting said member in a downwardly inclined position, an oil supply pipe at the upper edge of said member, said member having a slot along the lower edge of the oiling surface leading to the tank and grooves along the two side edges of said member, for conducting excess oil to said slot.

13. A device for oiling loaves comprising a member having a diagonally grooved metallic oiling surface and an oil supply conduit for feeding oil to said surface.

14. An oiling device comprising an elongated metallic member adapted to be supported in a position inclined to the horizontal, a portion of said member having a diagonally grooved surface, a supply tank, means for feeding oil to said surface and means for collecting and returning excess oil to said tank.

In witness whereof, I have hereunto set my hand this 27th day of December, 1921.

LAWRENCE S. HESS.